United States Patent Office 3,208,954
Patented Sept. 28, 1965

3,208,954
METHOD OF PREPARING TITANIUM TRICHLORIDE FOR USE AS A CATALYST IN OLEFIN POLYMERIZATION CONSISTING OF GRINDING TITANIUM TRICHLORIDE WITH AN ALUMINUM HALIDE
Ermbrecht Rindtorff, Recklinghausen, Karl Schmitt, Herne, and Günther Keller, Wanne-Eickel, Germany, assignors to Bergwerksgesellschaft Hibernia Aktiengesellschaft, Herne, Germany, a corporation of Germany
No Drawing. Filed Feb. 16, 1960, Ser. No. 16,113
Claims priority, application Germany, Feb. 24, 1959, B 52,224; Mar. 18, 1959, B 52,524
7 Claims. (Cl. 252—442)

The present invention relates to a method of preparing products of olefines using Ziegler catalysts comprising organo metallic compounds.

It is known that in the polymerization of higher olefines (starting with $C_3$) such as propylene, by means of organo metallic compounds and transition-metal compounds in accordance with Ziegler (see "Linear and Stereoregular Addition Polymers: Polymerization With Controlled Propagation," Norman G. Gaylord and Herman F. Mark, foreword by Giulio Natta, Interscience Publishers, Inc., New York, 1959), the polymers in view of their molecular structure can give stereoisomeric polymers. Particularly high percentages of uniform stereoisomeric and therefore crystallizable polymers are obtained if a solid crystalline salt, for instance the trichloride of titanium is used as a metal salt. Thus, in accordance with Natta (see the above cited work), up to 80% of crystalline polypropylene is obtained, for example, with the combination $TiCl_3$/aluminum triethyl. In accordance with a method which is not part of the prior art, the portion of the crystalline polypropylene can be substantially further increased (for example up to more than 90%) if aluminum diethyl monochloride is used instead of aluminum triethyl, employing as metal component a reduced transition-metal compound which has preliminarily been subjected for a brief time to mechanical comminution. It has furthermore already been proposed to prepare predominantly high molecular weight amorphous polymers which do not contain any disturbing oily portions by carrying out the polymerization with the use of titanium halides and aluminum trialkyls as catalysts in the presence of 10 to 500% of inert substances, particularly NaCl. In this connection, it is stated that for example in the polymerization of α-butylene, the crystalline portion decreases to 10%, while at the same time the yield can increase to 500%. It is required of the inert substances used that they be, first of all, water-soluble so that they can be subsequently dissolved out of the polymer and, secondly, that they be completely inert with respect to the catalyst.

In addition to this, it is also already known to polymerize ethylene in the presence of titanium halides, metallic aluminum, aluminum chloride and possibly also with the addition of an alkyl halide as a further catalyst component. In accordance with another proposal, polymerization is effected in the presence of a mixture of an aluminum halide and a halide of quadrivalent or pentavalent vanadium. In this case, metallic aluminum and possibly an alkyl halide are also added. The aluminum halide contained in the catalyst in this case causes the production of an aluminum alkyl compound from which the active polymerization exciter proper is then formed, together with the transition-metal compound.

The object of the present invention is to provide an improved method of preparing polymerization products from olefines having three and more carbon atoms, the olefines being gaseous at ordinary temperature, either alone or mixed with other olefines, possibly having a smaller number of carbon atoms, with the use of Ziegler catalysts. The feature of this novel method resides in using as the catalyst components compounds of the general formula $AlRX_2$ in which R is a hydrocarbon radical or hydrogen, and X is halogen or a hydrocarbon radical, together with a transition-metal compound (formed by reduction) which has preliminarily been subjected, together with an aluminum halide, to a mechanical treatment.

Accordingly, a further object of the invention is to provide the novel catalyst aforesaid for use in polymerizing the mentioned olefines.

The present invention is based on the surprising discovery that a substantial increase in the polymerization yield is obtained if for instance solid $TiCl_3$ is ground together with anhydrous aluminum chloride, preferably about 10 to 50% by weight based on the transition-metal component. In this case there are probably brought about crystal formations of a special type which presumably cause the specific course of the reaction. These effects, however, cannot take place if $AlCl_3$ alone is used as further catalyst component in the polymerization, as is done in some of the known processes. This action is all the more surprising since the aluminum halides are substances which are not inert to the aluminum alkyl compounds employed as organo metallic catalyst components. $AlCl_3$ has the further advantage over the inert substances previously proposed in that upon the subsequent alcohol scrubbing of the polymer, it is washed out together with the catalyst and therefore a separate scrubbing is unnecessary. The increase in the yield, (with simultaneous decrease of the crystalline portion to 40% when aluminum trialkyls are used as catalyst components) amounts to 10 times the customary value. Thus, in half the time otherwise customary, there are obtained with 1 gram of $TiCl_3$ in 1 liter of hydrocumene, upon the addition of 0.35 gram of $AlCl_3$, about 370 grams of polypropylene containing about 40% crystalline fraction and having an $\eta_{red}$-value of 6.2 which is free of low molecular oily polymers and is therefore particularly well suited in the event that flexible material is desired.

The further particularly surprising discovery was made that if there is used for instance as catalyst combination $TiCl_3$ and aluminum diethyl monochloride or aluminum monoethyl dichloride or mixtures thereof, and therefore a halogen-containing organo metallic catalyst component, an addition of preferably about 10 to 50% $AlCl_3$, based on the transition-metal component also brings about a considerable increase in the yield, but that in this case the high crystalline fraction, of for instance more than 90%, is maintained. Thus, for instance, with 1 gram of $TiCl_3$ in 1 liter of hydrocumene without addition of $AlCl_3$, there are obtained about 60 grams of polypropylene, while with an addition of 0.35 gram of $AlCl_3$, more than 250 grams of polypropylene are obtained in half the time, the high crystalline percentage of 95% not changing. It should be mentioned that in these cases the inert substances mentioned, such as NaCl, when ground together with the transition-metal component instead of or in addition to $AlCl_3$ do not change the high crystalline fraction, as is the case in the earlier process. Nevertheless, considerably increased yields are obtained with decreased times of reaction, the increase in the case of the use of NaCl alone being, to be sure, not entirely as great as upon the addition of aluminum chloride alone.

The polypropylene prepared with this catalyst combination has a very high molecular weight corresponding to an $\eta_{red}$-value of about 10. It can be thermally cracked very readily at temperatures of about 180 to 300° C.

within an interval of 1 to 5 minutes. In this cracking, the original very high molecular weight substance is so changed that in particular the portions which are difficultly soluble in fractional extraction and have the highest molecular weight are degraded. The substance is thereby made considerably more uniform in its molecular weight distribution and therefore can be worked up considerably better. Furthermore, by the cracking the molecular chains are separated at the weakest point. The fractions which are thus produced are stable and scarcely subject to further degradation. In this connection, the fractions (provided that the aforementioned operating conditions are precisely maintained) are just as crystalline and as insoluble in hydrocarbons as the high molecular weight uncracked material.

The $\eta_{red}$-value can, however, be kept lower even during the polymerization by the addition of regulators, for instance, in a manner similar to that employed in a known method, by the addition of small amounts of hydrogen to the olefine. In this connection, it has also surprisingly been found that in contradistinction to the data of the known process in the case of the catalyst combination of, for instance, $TiCl_3$ with 35% $AlCl_3$ (based on the $TiCl_3$) and aluminum diethyl monochloride, the addition of a small amount of hydrogen chloride, the addition of a small amount of hydrogen not only reduces the $\eta_{red}$-value but furthermore considerably increases the yield. Thus, for instance, with 1 gram of $TiCl_3$ in 1 liter of hydrocumene, an addition of 35% anhydrous $AlCl_3$, based on the $TiCl_3$ and a titanium:aluminum ratio of 1:2 (aluminum diethylmonochloride), about 330 grams of polypropylene were prepared with an $\eta_{red}$-value of about 4 and a crystalline fraction of about 95%. This is a yield of polymer in general, and of crystalline polypropylene in particular, such as never before achieved with any catalyst combination.

Since the addition of $AlCl_3$ to the reduced transition-metal compound effects a considerable increase of the polymerization velocity of the higher olefines, this catalyst can also be excellently used for the preparation of copolymers. A prerequisite for a catalyst to be suitable for the preparation of copolymers is that both monomers, for instance ethylene and propylene, undergo polymerization at the same velocity. Only then, is assurance present that actually true copolymers are produced and not mixtures of polymers, i.e., mixtures of polyethylene and polypropylene or possibly even a mixture of two copolymers, one of which contains considerably more ethylene and the other considerably more propylene. Heretofore, two catalyst combinations have been proposed which actually give true copolymers, namely $TiCl_3$ and aluminum dialkylmonochloride as well as $VOCl_3$ and aluminum trihexyl. In both cases, the higher rate of polymerization of the ethylene was throttled and brought to the order of magnitude of that of the propylene so that copolymers are produced with the polymerization rate of the propylene. In the case of the catalyst combination proposed here, the polymerization velocity of the propylene on the other hand is so greatly increased that it becomes equal to that of ethylene so that very good copolymers are thus obtained with the considerably higher polymerization velocity of the ethylene. These copolymers (as shown by fractionations) are even more uniform in their composition than those previously known. In this connection, the products which are prepared with aluminum triethyl and halogen-containing aluminum alkyls, in particular aluminum diethyl monochloride can scarcely be distinguished.

The mechanical treatment of the transition-metal compounds and of the aluminum halide can, for example, be effected by a method wherein the compounds are ground for a short time in a ball mill. In this case, special after-treatment is not necessary and the mixture, for example, of titanium trichloride and $AlCl_3$ can rather be used directly as catalyst component, and it is further more notable for a high stability which permits readily reproducible values. The grinding is advisedly effected in an atmosphere of an inert gas, as for example, under nitrogen, in the manner that a suspension is first of all prepared in a portion of the solvent used as polymerization auxiliary liquid, for instance isopropyl cyclohexane, Fischer-Tropsch diesel oil, gasolines, aliphatin, cyclohexane, etc., and the suspension ground therein. If all or a part of the aluminum alkyl compound necessary for the polymerization is added during the grinding, this has the special effect that upon the subsequent polymerization, the percentage of crystalline product is again reduced while on the other hand the polymerization velocity and the catalyst yield are increased. This applies analogously also when the treatment of the transition metal component is effected in the presence of NaCl together with, or instead of, aluminum chloride. In cases in which a particularly high crystalline product is desired, no aluminum alkyl therefore is added in the mechanical treatment. It is advantageous to subject the transition-metal compound, for instance the titanium chloride, to the treatment in relatively coarsely granular form, such as is obtained for instance upon the reduction of titanium tetrachloride with hydrogen, and then use it for the polymerization. The important factor in the comminuting is not so much obtaining specific particle sizes but rather in creating new surfaces. The treatment, accordingly, is effected only for as short a time (for instance 30 minutes) as is necessary to satisfy this purpose and at the same time to avoid the occurrence of instability. The times employed in the grinding are generally within the range of 10 minutes to 5 seconds.

By the present invention it is accordingly made possible to effect the polymerization of higher olefines or the copolymerization of olefines, in connection with which one monomer is possibly a lower olefine, in an extremely economic and industrially satisfactory manner with high space-time yields. Furthermore, the possibility is created of controlling the properties of the polymer in the manner described above and accordingly, by a suitable control of the polymerization, obtaining products for the most varied purposes of use. It is also particularly important in the preparation of the amorphous products that it is now possible for the first time to obtain in an industrially satisfactory manner, and with economic catalyst yields, a product which is free of low molecular weight, oily polymers, and thus easy to handle and to work up.

*Example I*

One gram of $TiCl_3$ and 0.35 gram of anhydrous $AlCl_3$ are formed into a suspension, under an atmosphere of nitrogen, in a small amount of hydrocumene (50 to 100 cc.) in a ball mill and ground for ½ to 1 hour. Thereupon the suspension is washed into an autoclave containing one liter of hydrocumene and then about 1.6 grams of aluminum triethyl is added, Propylene is then impressed to a pressure of 6 atmospheres gauge. Upon commencement of the polymerization, cooling is employed and the temperature maintained at about 60 to 70° C. After about 5 hours, the absorption decreases. The content of the reactor is now worked up in the customary manner with propanol. Yield: 370 grams polypropylene having an $\eta_{red}$-value of 6.2 and 45% crystalline fraction.

*Example II*

One gram of $TiCl_3$ and 0.35 gram anhydrous $AlCl_3$ are ground under a nitrogen atmosphere in a ball mill as in Example I and then brought into an autoclave containing 1 liter of hydrocumene. Thereupon about 1.6 grams of aluminum diethyl monochloride is added and propylene is impressed to a pressure of 8 atmospheres gauge. Upon commencement of the polymerization, the temperature is maintained at 60 to 70° C. by cooling.

After about 5 hours, the propylene absorption decreases, and the content of the reactor is worked up in the customary manner with propanol. The yield is about 245 grams of polypropylene having an $\eta_{red}$-value of 11.6 and a crystalline fraction of 94.5%.

*Example III*

1 gram of $TiCl_3$ and 0.35 gram of anhydrous $AlCl_3$ are ground as in Example II and introduced into 1 liter of hydrocumene. About 1.6 grams of aluminum diethyl monochloride is then added, and propylene, to which in addition 0.1% by volume $H_2$ is added, is then impressed to a pressure of 8 atmospheres gauge. After polymerization for about 5 hours, the yield is 325 grams of polypropylene having an $\eta_{red}$-value of 3.9 and a crystalline portion of 94%.

*Example IV*

1 gram of $TiCl_3$ and 0.35 gram of anhydrous $AlCl_3$ are ground in a ball mill under nitrogen in the manner described in Example I and then introduced into an autoclave containing 1 liter of hydrocumene. In two experiments, about (a) 1.6 grams aluminum triethyl
(b) 1.6 aluminum diethyl monochloride were added in each case and ethylene and propylene then introduced in the same volumetric ratio, maintaining a total pressure of about 5 atmospheres gauge. After about 4 hours the yield in case (a) is 290 grams copolymer having an $\eta_{red}$-value of 2.3; and in case (b) is 276 grams copolmer having an $\eta_{red}$-value of 2.9.

In case (b), i.e., without the addition of $AlCl_3$, about 60 to 80 grams copolymer are obtained with 1 gram of titanium trichloride and about 1.6 aluminum diethyl monochloride under the same conditions. With aluminum triethyl alone, a polymer mixture is obtained, rather than a copolymer.

Various changes and modifications may be made without departing from the spirit and scope of the present invention and it is intended that such obvious changes and modifications be embraced by the annexed claims.

What is claimed is:

1. Method of preparing $TiCl_3$ for use in combination with a cocatalyst selected from the group consisting of aluminum alkyls and aluminum alkyl halides in the low pressure polyermization of olefins which consists essentially in grinding $TiCl_3$ with an aluminum halide.
2. Method in accordance with claim 1, wherein the aluminum halide is $AlCl_3$.
3. Method in accordance with claim 1, wherein the aluminum halide is anhydorus $AlCl_3$.
4. Method in accordance with claim 3, wherein the grinding is carried out under an inert atmosphere.
5. Method in accordance with claim 4, wherein the grinding is carried out in the presence of an inert solvent.
6. Method in accordance with claim 4, wherein the $AlCl_3$ constitutes about 10–50% by weight of the $TiCl_3$.
7. Method in accordance with claim 4, wherein the $AlCl_3$ constitutes about 35% by weight of the $TiCl_3$.

References Cited by the Examiner

UNITED STATES PATENTS

| | | | |
|---|---|---|---|
| 2,899,418 | 8/59 | Reynolds | 260—94.9 |
| 3,010,787 | 11/61 | Tornqvist | 260—93.7 |
| 3,014,016 | 12/61 | Natta et al. | 260—93.7 |

FOREIGN PATENTS

| | | |
|---|---|---|
| 794,785 | 5/58 | Great Britain. |
| 807,204 | 1/59 | Great Britain. |
| 1,173,537 | 10/58 | France. |
| 1,176,194 | 11/58 | France. |

OTHER REFERENCES

Gaylord et al.: Linear and Stereoregular Addition Polymers Interscience Publishers Inc., New York, N.Y. (1959), pages 162 and 163.

JOSEPH L. SCHOFER, *Primary Examiner.*

L. H. GASTON, M. LIEBERMAN, *Examiners.*